US007027569B2

(12) United States Patent
Price (10) Patent No.: US 7,027,569 B2
(45) Date of Patent: Apr. 11, 2006

(54) TELEPHONE CALL SCREENING SYSTEM AND METHOD AND CALLER REGISTRATION SYSTEM AND METHOD FOR USE THEREWITH

(75) Inventor: Stephen L. Price, Huntington Station, NY (US)

(73) Assignee: Prologue Communications, Inc., Haverhill, MA (US)

( * ) Notice: Subject to any disclaimer, the term of this patent is extended or adjusted under 35 U.S.C. 154(b) by 585 days.

(21) Appl. No.: 10/073,605

(22) Filed: Feb. 11, 2002

(65) Prior Publication Data

US 2003/0152198 A1    Aug. 14, 2003

(51) Int. Cl.
*H04M 11/00*    (2006.01)

(52) U.S. Cl. .............................. 379/88.16; 379/88.19; 379/201.02

(58) Field of Classification Search ............. 379/88.16, 379/88.22–88.24, 88.19–88.21, 142.01, 142.04–142.06, 379/142.07, 142.15, 142.18, 201.02, 201.11, 379/201.12, 207.02, 207.11, 207.13–207.15, 379/207.16, 208.01, 210.02, 210.03, 211.01, 379/211.02, 211.03, 213.01, 214.01; 707/100, 707/104.1, 10, 1
See application file for complete search history.

(56) References Cited

U.S. PATENT DOCUMENTS

| 4,304,968 A | 12/1981 | Klausner et al. |
| 4,497,980 A | 2/1985 | Gorman et al. |
| 4,720,848 A | 1/1988 | Akiyama |
| 4,899,358 A | 2/1990 | Blakley |
| 5,060,255 A | 10/1991 | Brown |
| 5,086,458 A * | 2/1992 | Bowen ....................... 379/180 |
| 5,109,405 A | 4/1992 | Morganstein |
| 5,157,712 A * | 10/1992 | Wallen, Jr. .................... 379/74 |
| 5,276,731 A | 1/1994 | Arbel et al. |
| 5,388,150 A | 2/1995 | Schneyer et al. |
| 5,392,341 A | 2/1995 | Wilkinson et al. |
| 5,406,618 A | 4/1995 | Knuth et al. |
| 5,467,388 A | 11/1995 | Redd, Jr. et al. |
| 5,481,594 A | 1/1996 | Shen et al. |
| 5,497,414 A * | 3/1996 | Bartholomew ......... 379/142.02 |
| 5,511,111 A | 4/1996 | Serbetcioglu et al. |
| 5,526,406 A | 6/1996 | Luneau |
| 5,563,935 A | 10/1996 | Small |
| 5,604,790 A | 2/1997 | Grimes |
| 5,644,629 A | 7/1997 | Chow |
| 5,646,979 A | 7/1997 | Knuth |

(Continued)

OTHER PUBLICATIONS

Harry Newton, Newton's Telecom Dictionary, 8th Ed., Flatiron Publishing, Inc., p. 864.*

*Primary Examiner*—Ovidio Escalante
(74) *Attorney, Agent, or Firm*—Grossman Tucker Perreault & Pfleger, PLLC (57) ABSTRACT

A telephone call screening system screens telephone calls placed to a subscriber based upon a preferred caller database established by the subscriber from a networked caller registry database. A caller registration system allows callers to select a private identifier unique to the caller and registers the callers in a caller registry database. The subscriber establishes the preferred caller database by connecting to the caller registration system and selecting the preferred callers. The private identifiers associated with the selected preferred callers are then stored in the preferred caller database. When a caller calls the subscriber, the caller is asked to enter the caller's private identifier. A caller disposition process is initiated based on whether the private identifier is in the preferred caller database.

21 Claims, 6 Drawing Sheets

U.S. PATENT DOCUMENTS

| | | |
|---|---|---|
| 5,651,053 A | 7/1997 | Mitchell |
| 5,651,055 A * | 7/1997 | Argade .................... 379/88.01 |
| 5,661,788 A | 8/1997 | Chin |
| 5,675,633 A | 10/1997 | Kopp et al. |
| 5,727,045 A | 3/1998 | Kim |
| 5,734,706 A | 3/1998 | Windsor et al. |
| 5,745,562 A | 4/1998 | Penning |
| 5,757,899 A | 5/1998 | Boulware et al. |
| 5,796,806 A | 8/1998 | Birckbichler |
| 5,822,416 A | 10/1998 | Goodacre et al. |
| 5,862,323 A | 1/1999 | Blakley, III et al. |
| 5,897,616 A | 4/1999 | Kanevsky et al. |
| 5,923,731 A | 7/1999 | McClure |
| 5,930,338 A | 7/1999 | McKendry et al. |
| 5,978,451 A * | 11/1999 | Swan et al. ............... 379/88.24 |
| 5,991,367 A | 11/1999 | Robuck |
| 5,999,599 A | 12/1999 | Shaffer et al. |
| 5,999,973 A | 12/1999 | Glitho et al. |
| 6,005,870 A | 12/1999 | Leung et al. |
| 6,031,899 A * | 2/2000 | Wu ....................... 379/142.01 |
| 6,122,347 A | 9/2000 | Borland |
| 6,173,041 B1 * | 1/2001 | Borland et al. ............ 379/67.1 |
| 6,178,230 B1 * | 1/2001 | Borland .................... 379/67.1 |
| 6,192,118 B1 | 2/2001 | Bayless et al. |
| 6,298,122 B1 | 10/2001 | Horne |
| 6,359,970 B1 | 3/2002 | Burgess |
| 6,369,970 B1 * | 4/2002 | Steinhoff et al. ............. 360/75 |
| 6,373,925 B1 | 4/2002 | Guercio et al. |
| 6,442,249 B1 * | 8/2002 | Miller, Jr. ................ 379/93.09 |
| 6,456,706 B1 | 9/2002 | Blood et al. |
| 6,584,188 B1 * | 6/2003 | Kim ..................... 379/211.02 |
| 6,626,270 B1 * | 9/2003 | Drennen et al. ............ 188/72.1 |
| 6,697,479 B1 * | 2/2004 | Barnes et al. .......... 379/215.01 |
| 6,704,395 B1 * | 3/2004 | Borland et al. ............ 379/67.1 |
| 6,711,239 B1 * | 3/2004 | Borland .................... 379/67.1 |
| 6,741,680 B1 * | 5/2004 | Bates et al. ............. 379/88.22 |
| 6,804,334 B1 * | 10/2004 | Beasley et al. .......... 379/88.17 |

* cited by examiner

TELEPHONE CALL SCREENING SYSTEM AND METHOD AND CALLER REGISTRATION SYSTEM AND METHOD FOR USE THEREWITH

TECHNICAL FIELD

The present invention relates to telephony systems and more particularly, relates to a telephone call screening system and method and a caller registration system and method for use therewith.

BACKGROUND INFORMATION

Telemarketers and other entities placing unsolicited telephone calls have created an increasing volume of nuisance telephone calls both to homes and to businesses. Various systems and methods have been used in an attempt to screen telephone calls such that these nuisance calls can be rejected and calls from preferred callers can be accepted. According to one technique used at home, a called party can listen to a message being left by the caller on an answering machine and determine whether or not to pick up the telephone and answer the call. This technique, however, does not entirely eliminate the nuisance of unwanted telephone calls because the called party must still listen to the message being left on the answering machine.

According to another system and method, a caller ID system can be used to identify the caller according to the telephone number of the caller. The user can use this system to screen calls based upon the telephone number of the telephone line on which the call is placed. In other words, the user can reject calls that are not identified as coming from a telephone number associated with a preferred caller. This technique also has some limitations in that a preferred caller may be unintentionally screened out when the preferred caller is placing a telephone call from a different telephone having a telephone number that is not associated with the preferred caller.

Other types of call screening systems prompt a caller to enter a code or PIN number to complete a call to a called party. In such systems, however, the code or PIN number is established by the called party and given to the preferred callers from whom the called party will accept telephone calls. If a caller does not enter the called party's code or PIN number, the telephone call from that caller will not be accepted. This technique also presents a problem in that the callers are required to remember the code or PIN number selected by and unique to the called party, and most likely must remember multiple codes from multiple called parties using the system. Also, if a called party gives the code or PIN number to a caller and then desires to prevent the caller from calling, the called party must change the PIN number and notify all of the other preferred callers of the change.

Accordingly, a system and method is needed for effectively screening nuisance telephone calls and accepting telephone calls from preferred callers independent of the telephone line placing the call and without using a code or PIN number unique to the called party.

SUMMARY

To address the needs discussed above, a system and method is provided for screening telephone calls. According to the telephone call screening system and method, a preferred caller database is established comprising caller identifying information for preferred callers selected by a subscriber. The caller identifying information for each caller includes at least a private identifier.

A telephone call placed by a caller is automatically answered and the caller is interrogated by requesting from the caller at least a private identifier. If the private identifier is not received within a predetermined period of time, the system initiates an unidentified caller disposition process. If the private identifier is received, the private identifier is stored and the preferred caller database is searched for the private identifier. If the caller is not in the preferred caller database, the system initiates an unpreferred caller disposition process. If the caller is in the preferred caller database, the system initiates a preferred caller disposition process.

According to another aspect of the present invention, a computerized telephone call screening system comprises a data communications interface for interfacing with a data network. A caller registration system access application accesses a caller registry database over the data network and selects preferred callers from the caller registry database to establish a preferred caller database. The call screening system further comprises a telephony interface for interfacing with at least one telephone line and for answering telephone calls placed by callers. A call processing application processes the telephone calls by requesting at least private identifiers and searches the preferred caller database for the private identifiers received from said callers. The call processing application accepts calls from the preferred callers.

According to another aspect of the present invention, a call processing application is stored on a storage medium for use in the computerized telephone call screening system. The call processing application comprises: code for receiving a private identifier provided by a caller placing a telephone call; code for storing the private identifier; code for searching a preferred caller database for a matching private identifier; and code for disposing of the telephone call.

According to another aspect of the present invention, a system and method is provided for establishing a preferred caller database for use in a computerized telephone call screening system. The system and method connects a caller to a computerized caller registration system and prompts the caller for caller identifying information including at least a private identifier selected by the caller. The caller identifying information is received, verified and stored in a caller registry database of registered callers. The system and method also connects to a subscriber, verifies that the subscriber is allowed to access the caller registry database, and provides the subscriber with access to the caller registry database. The preferred caller selections are received from the subscriber, and the caller identifying information of the preferred callers is transferred to a preferred caller database including the private identifiers of the preferred callers.

According to a further aspect of the present invention, the computerized caller registration system comprises a telephony interface for interfacing with at least one telephone line and a caller registry database containing caller identifying information including at least private identifiers of registered callers. A caller registration application prompts the caller for caller identifying information including at least a private identifier selected by the caller, receives and verifies the caller identifying information, and stores the caller identifying information in the caller registry database. The caller registration system also comprises a communications interface for interfacing with a data network. A database access application provides the subscriber with access to the caller registry database, receives preferred caller selections from the subscriber, and transfers the caller identifying information of the preferred callers to a preferred caller database including the private identifiers of the preferred callers.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
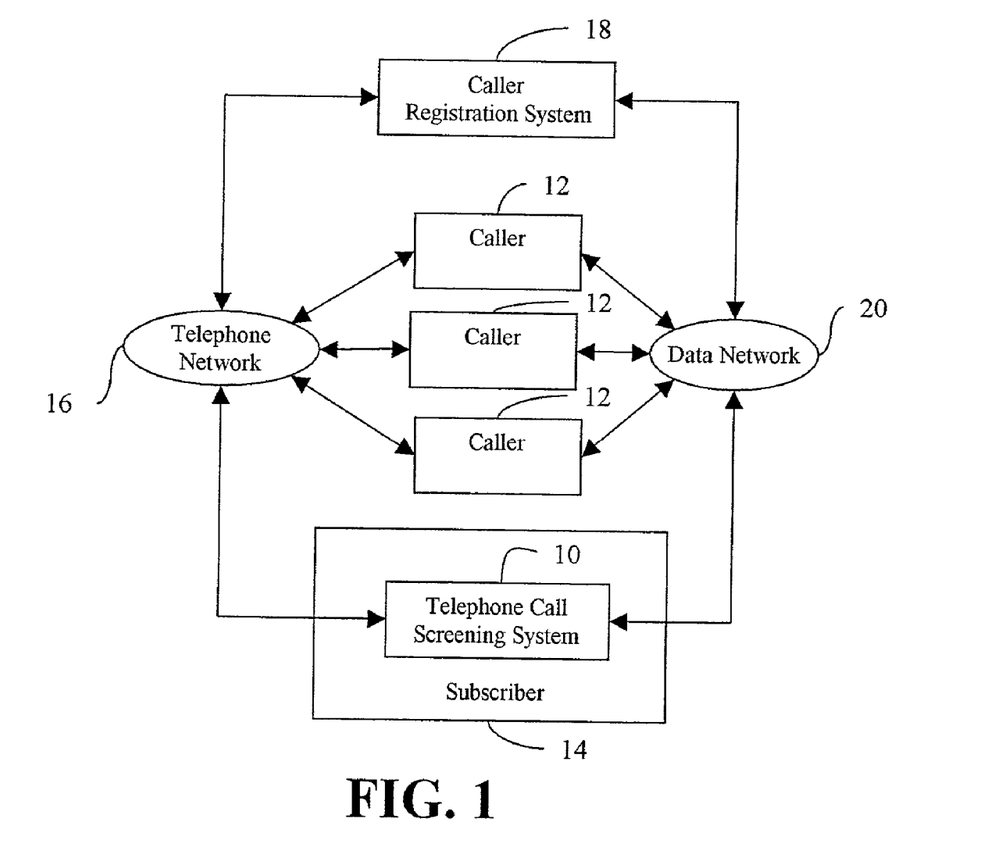
FIG. 1 is a schematic block diagram of a telephone call screening system and caller registration system, according to the present invention.

A telephone call screening system 10, FIG. 1, according to the present invention, is used to screen calls placed by callers 12 to a subscriber 14 over a telephone network 16, such as the public switched telephone network (PSTN) or the integrated services digital network (ISDN). The telephone call screening system 10 is connected to a caller registration system 18 preferably by a data network 20 such as the Internet. The caller registration system 18 is used by the callers 12 to register and is used by the subscriber 14 to select preferred callers from the registered callers.

Figure 2:
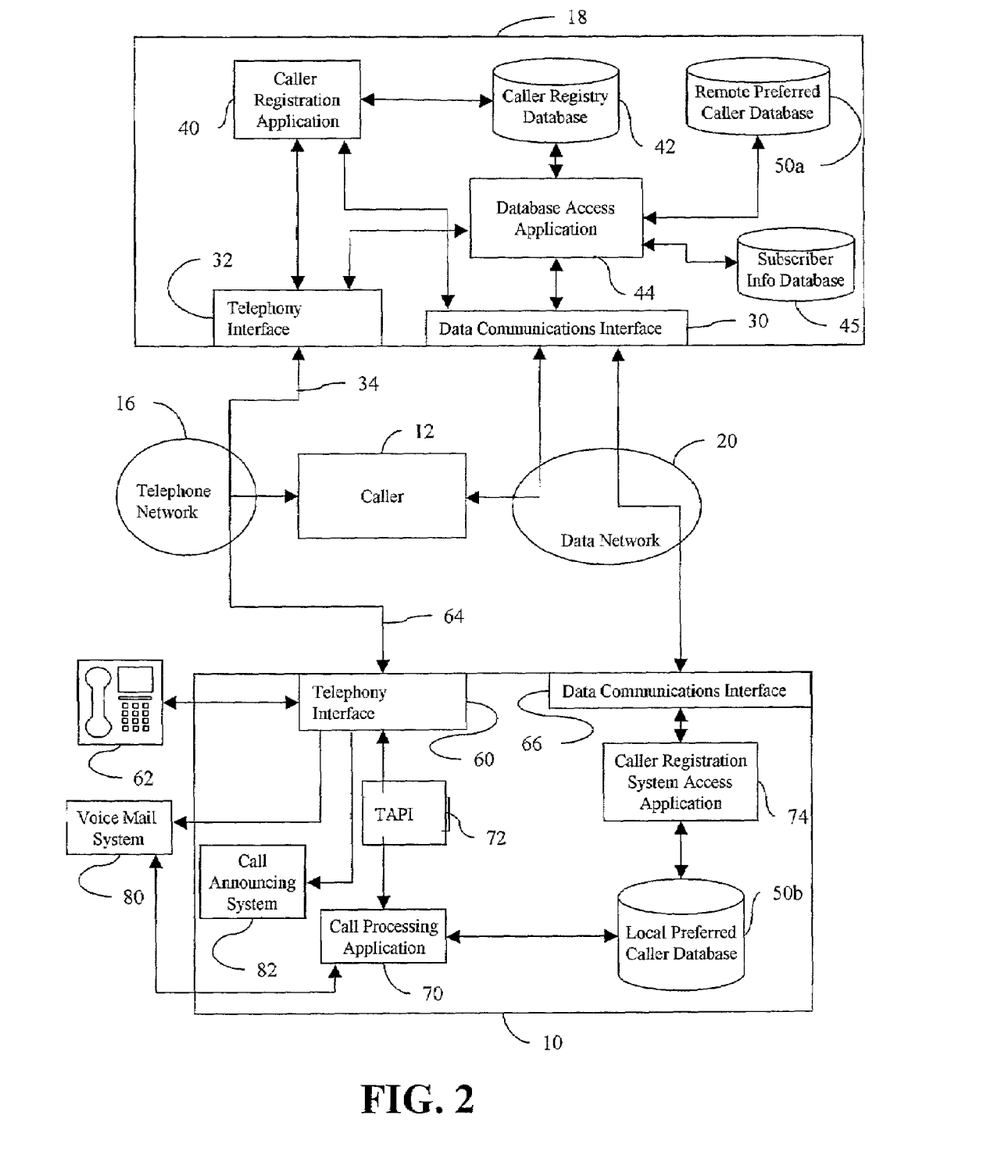
FIG. 2 is a schematic block diagram of a telephone call screening system and caller registration system, according to one embodiment of the present invention.

Referring to FIG. 2, the telephone call screening system 10 and the caller registration system 18 are described in greater detail. According to one embodiment, the caller registration system 18 is implemented using one or more server computers running web server software such as the Internet information server (IIS) available from Microsoft. The caller registration system 18 preferably includes a data communications interface 30, such as a modem or network card, which connects the caller registration system 18 to the data network 20. One embodiment of the caller registration system 18 also includes a telephony interface 32, such as telephony card or board, which connects the caller registration system 18 to one or more telephone lines 34. The caller registration system 18 can also include other hardware known to those skilled in the art for interacting with callers by telephone, such as a voice response unit (???).

The caller registration system 18 further includes a caller registration application 40 that communicates with the data communications interface 30 and/or the telephony interface 32 to register callers in a caller registry database 42. In one example, the caller registry database 42 is implemented using a client-server database management system such as a Microsoft Sequel Server database.

The caller registration system 18 also includes a database access application 44 that communicates with the data communications interface 30. The database access application 44 manages access to the caller registry database 42 by the subscriber using the telephone call screening system 10 and enables the subscriber to establish a preferred caller database 50a, 50b of preferred callers. In one example, the database access application 44 is implemented using an active server pages (ASP) application running on the IIS. The active server pages (ASP) application creates caller registry database web pages for the subscriber to interact with the caller registration system 18, as described in greater detail below.

The caller registration system 18 can also include other software known to those skilled in the art for communicating and interacting with a caller via the telephone interface 32 or the data communication interface 30.

According to one embodiment, the telephone call screening system 10 is implemented using a computer with an operating system such as a version of the Microsoft WINDOWS operating system. Alternatively, the telephone call screening system 10 can be implemented as a stand-alone device. The telephone call screening system 10 includes a telephony interface 60, such as a telephony card or board, which interfaces with a subscriber's telephone 62 and one or more telephone lines 64. The telephone call screening system 10 also includes a data communications interface 66, such as a modem or network card, which connects the telephone call screening system 10 to the data network 20.

The telephone call screening system 10 further includes a call processing application 70. The call processing application 70 preferably includes one or more software modules that handle communication with the telephony interface 60 and processing of the telephone calls by screening the telephone calls and initiating caller disposition procedures. In one example, the call processing application 70 is implemented as a visual basic application that communicates with the telephony interface 60 using a telephony application programming interface (TAPI) 72, such as the TAPI supported by the Microsoft Windows operating system.

The telephone call screening system 10 further includes a caller registration system access application 74 for accessing the caller registration system 18 over the data network 20. In one embodiment, the caller registration system access application 74 is implemented using a web browser application. The web browser application displays the web pages created by the database access application 44 and allows the subscriber to send and receive information from the caller registration system 18. Alternatively, the caller registration system access application 74 can be a software application that connects to the caller registration system 18 over the data network 20 and provides a customized user interface for interacting with the caller registration system 18.

In another embodiment, the caller registration system access application 74 accesses the caller registration system 18 over the telephone network 16. For example, the telephony interface 60 uses a common channel signaling system No. 7 (SS7) with transactions capabilities applications part (TCAP) to access the caller registration 18 over the telephony network 16. The telephone call screening system 10 can also access the caller registration system 18 by a telephone connection and data connection simultaneously.

In one embodiment, a local preferred caller database 50a is part of the telephone call screening system 10. In another embodiment, a remote preferred caller database 50a is part of the caller registration system 18 and accessed through the data network 20, for example, using a continuous Internet connection.

A voice mail system 80 can be used for playing prerecorded messages to callers and for storing messages from callers. The voice mail system 80 is known to those skilled in the art and can be implemented as part of the telephone call screening system 10 or as a separate voice mail system. The voicemail system 80 can be set up by a subscriber using the call processing application 70 to play a prerecorded message for a specific preferred caller. The voice mail system 80 permits voicemail to be filtered into at least two groupings, identified preferred callers and unidentified or unpreferred callers.

The call screening system 10 can also include a call announcing system 82 for announcing calls, for example, with an audible or visual announcement. The call announcing system 82 can be implemented using conventional hardware, such as a sound card and PC speakers, and software. The call announcing system 82 can record the callers voice and play the recording over the speakers. Alternatively, an audible announcement of the caller's name can be recorded and stored in the preferred caller database. In another embodiment, the call announcing system 82 causes the telephone 62 to ring with a characteristic set of rings and/or a flashing light indicating a preferred caller. In a further embodiment, the call announcing system 82 causes caller identifying information to be displayed, for example, on the PC monitor.

The call screening system 10 can also include an automatic activation system that automatically activates the system 10. For example, the call screening system 10 can be linked to a motion detector, security system, or other device that detects the subscriber's presence. The call screening system 10 can also include an audible command response system that responds to audible commands by the subscriber, such as voice commands or clapping.

Figure 3:
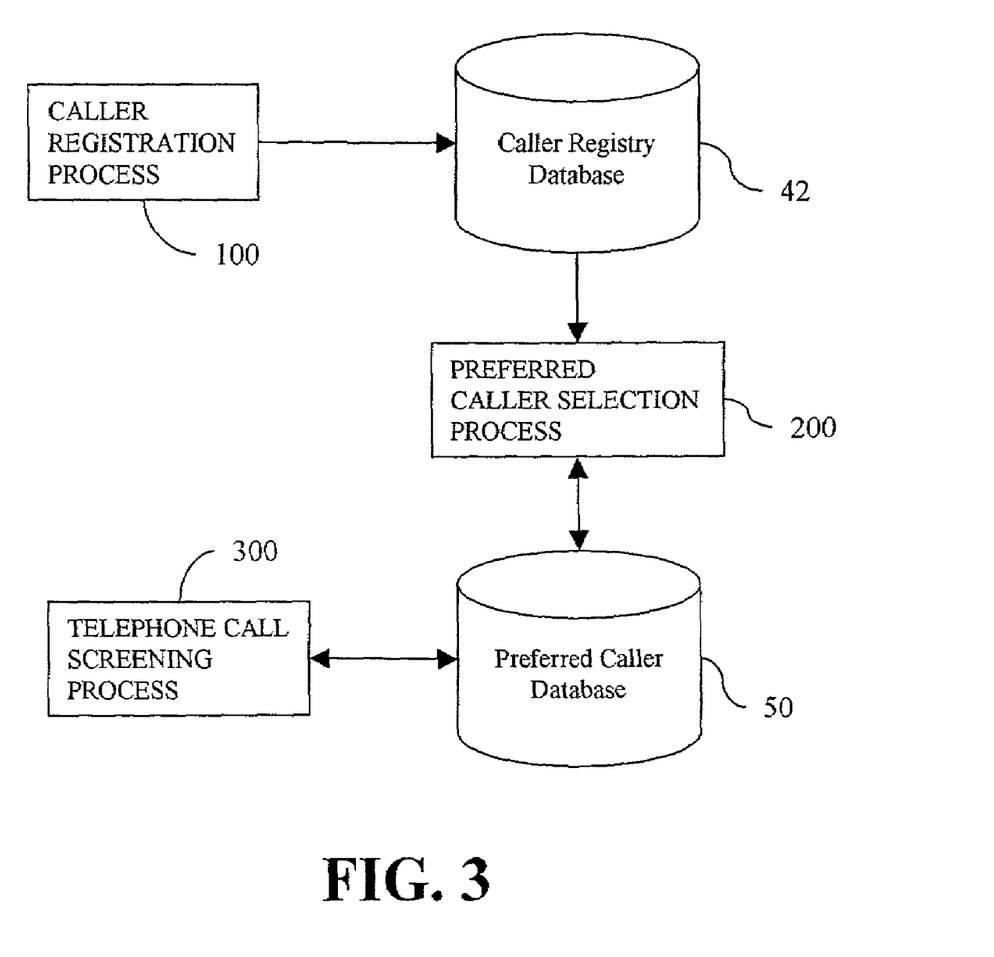
FIG. 3 is a functional block diagram of the method, according to one embodiment of the present invention.

Referring to FIG. 3, the methods of the present invention are shown in general. The caller registration process 100 registers callers in the caller registry database 42. A preferred caller selection process 200 establishes the preferred caller database 50 from registered callers selected from the caller registry database 42. A telephone call screening process 300 screens the telephone calls based upon the callers in the preferred caller database 50.

Figure 4:
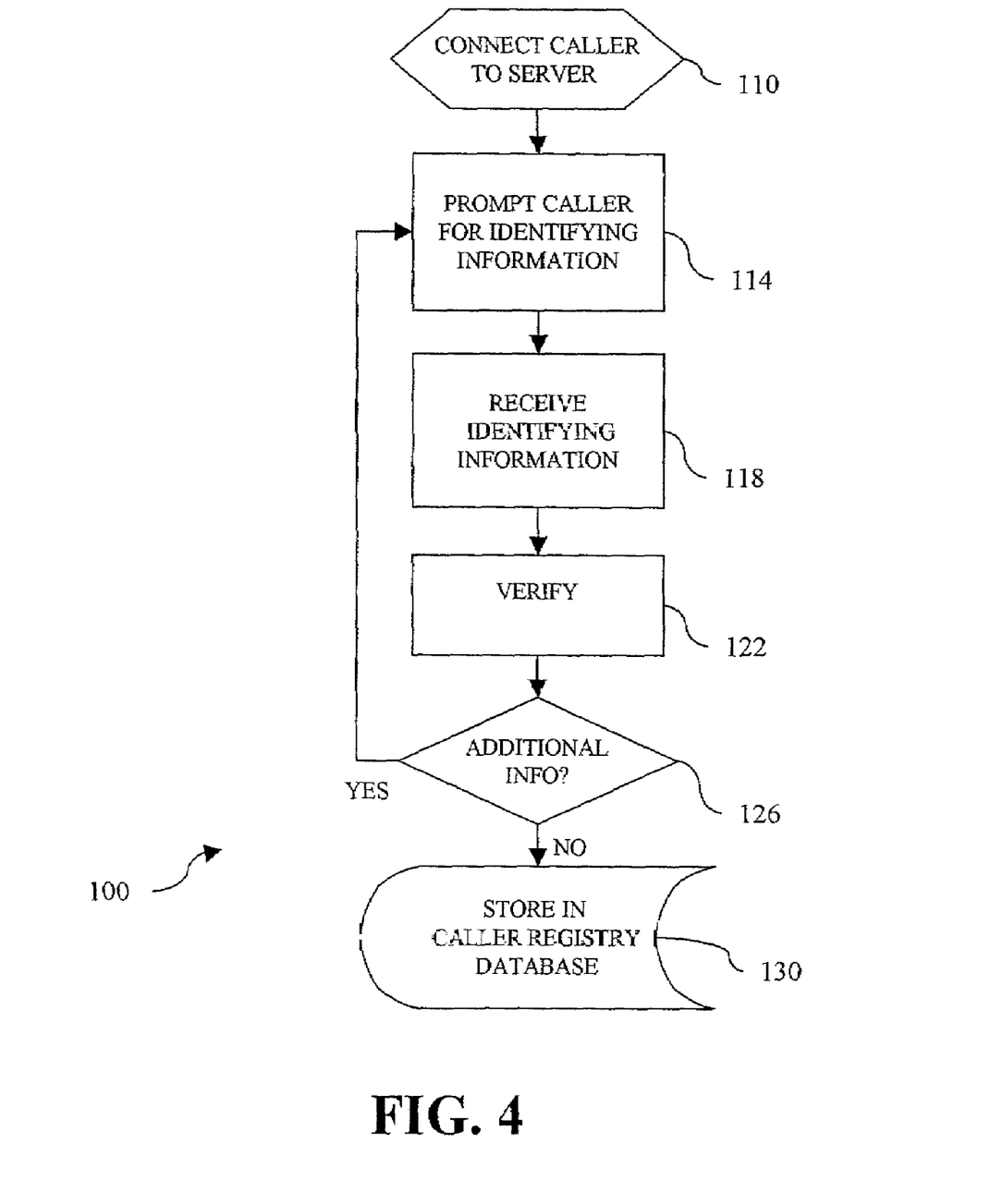
FIG. 4 is a flow chart illustrating the caller registration process, according to one method of the present invention.

The caller registration process 100, FIG. 4, begins by connecting a caller 12 to the caller registration system 18, step 110. In one example, the caller calls the caller registration system 18 by telephone and connects to the server computer by way of the telephony interface 32. The caller then interacts with the caller registration system 18, for example, using DTMF tones entered using the telephone or by voice commands. In another example, the caller connects to the server computer of the caller registration system 18 via the data network 20 (e.g., the Internet). The caller then interacts with the caller registration system 18, for example, by browsing and interacting with caller registration web pages.

After the caller connects to the caller registration system 18, the caller is prompted for identifying information, step 114. The caller may first be asked preliminary questions, such as whether the caller is registering for the first time or whether the caller is modifying an existing registration. The identifying information includes at least a public identifier such as the caller's name or telephone number and a private identifier that is selected by the caller such as a PIN or other type of password. Other types of private identifiers are also contemplated including, but not limited to, a voiceprint, fingerprint, or a biometric method. The identifying information can also include the caller's telephone number, address, and any other type of information pertaining to the caller. If the caller is connected to the caller registration system 18 by way of the telephone network 16, the caller registration system 18 plays a message prompting the caller for the identifying information. If the caller is connected to the caller registration system 18 by way of the data network 20, the caller registration system 18 sends text messages (e.g., web pages) requesting the identifying information.

After the caller enters the identifying information requested by the caller registration system 18, the caller registration system 18 receives the identifying information, step 118, and verifies the identifying information, step 122. For example, the caller registration system 18 verifies that either the public or the private identifier is unique to the caller (i.e., no prior registered caller has registered with that PIN or password). This process can be repeated until all of the caller information is received and verified, step 126.

The private identifier received by the caller is preferably encrypted by the caller registration system 18, for example, using public key cryptography such as the Massachusetts Institute of Technology (MIT) pretty good privacy (PGP). The caller identifying information including the encrypted private identifier is then stored in the caller registry database 42, step 130. For example, a caller registration record is created in the caller registry database 42 including at least the public identifier and associated private identifier.

Figure 5:
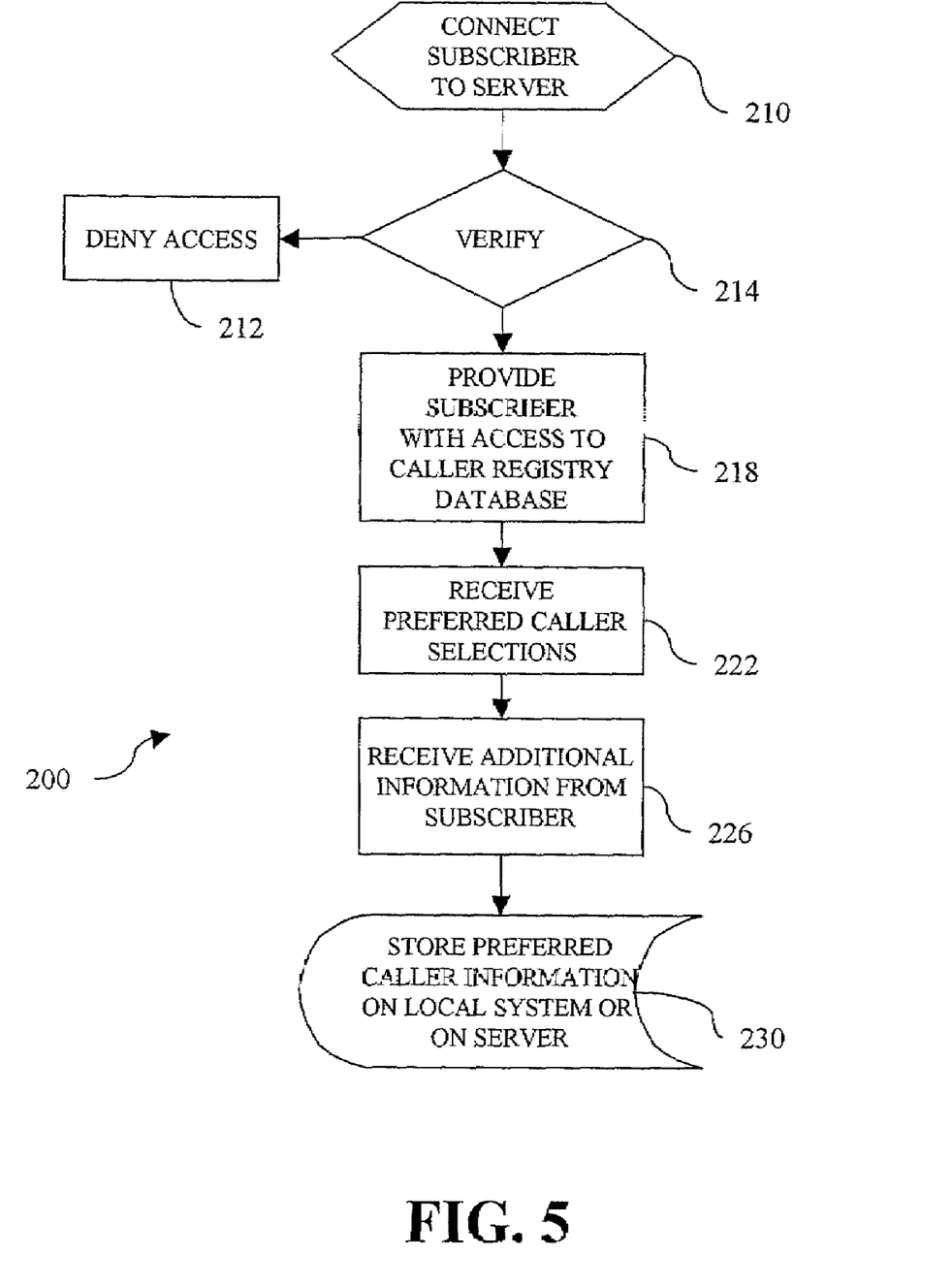
FIG. 5 is a flow chart illustrating the preferred caller selection process, according to one method of the present invention.

According to the preferred caller selection process 200, FIG. 5, the subscriber using the telephone call screening system 10 is connected to the caller registration system 18, step 210. For example, the subscriber uses the web browser application to access the caller registry database web site and logs in, for example, by entering a subscriber user name and password. Alternatively, the call screening system 18 can connect to the caller registration system by telephone (e.g., by dialing a toll-free number).

The caller registration system 18 then verifies that the subscriber is entitled to access the caller registry database 42, step 214. In one example, the subscriber is required to purchase a license to access the caller registry database 62 and the caller registration system 18 verifies that the subscriber's license is valid. The caller registration system 18 verifies that the subscriber is the registered owner of the telephone call screening system 10 by attempting to locate the license in a subscriber information database 45. If the license is not valid, the preferred caller database 50a, 50b is disabled until the license is reinstated. The telephone call screening system 10 can be configured to require periodic (e.g., monthly) calls to the caller registration system 18 to remain operational and to update any private identifiers that may have changed.

If the subscriber is hot verified (e.g., the user name and/or password are incorrect), the subscriber is denied access to the caller registry database 42, step 212. If the subscriber is verified, the caller registration system 18 provides the subscriber with access to the caller registry database 62. For example, the caller registration system 18 provides the subscriber with a directory listing of all the registered callers in the caller registry database 42. The subscriber can then select the preferred callers from the list of registered callers in the caller registry database 42.

The preferred caller selections are received by the caller registration system 18, step 222, and the identifying information is located in the caller registry database 42. The identifying information including the encrypted private identifiers for the preferred callers selected by the subscriber is downloaded to the remote preferred caller database 50a and/or stored on the local preferred caller database 50b, step 230. The subscriber can also add other information to be associated with the identifying information of the preferred caller such as the nature of the caller's relationship to the subscriber (e.g., family, friend, business associate and the like), step 226. In a similar manner, the subscriber can also create an unwanted caller database including identifying information for unwanted callers. The encrypted private identifiers are preferably downloaded together with an encryption key for deciphering the encrypted private identifiers.

The preferred caller selection process 200 can be repeated whenever the subscriber wishes to add or remove preferred or unwanted callers or to update the identifying information for existing preferred or unwanted callers. If the subscriber has a continuous connection to the data network, the telephone call screening system 10 can be programmed to automatically update the identifying information for the preferred callers selected by the subscriber. The telephone call screening system 10 may also be programmed to periodically connect to the caller registration system 18 to renew the subscriber's license to access the caller registry database.

Figure 6:
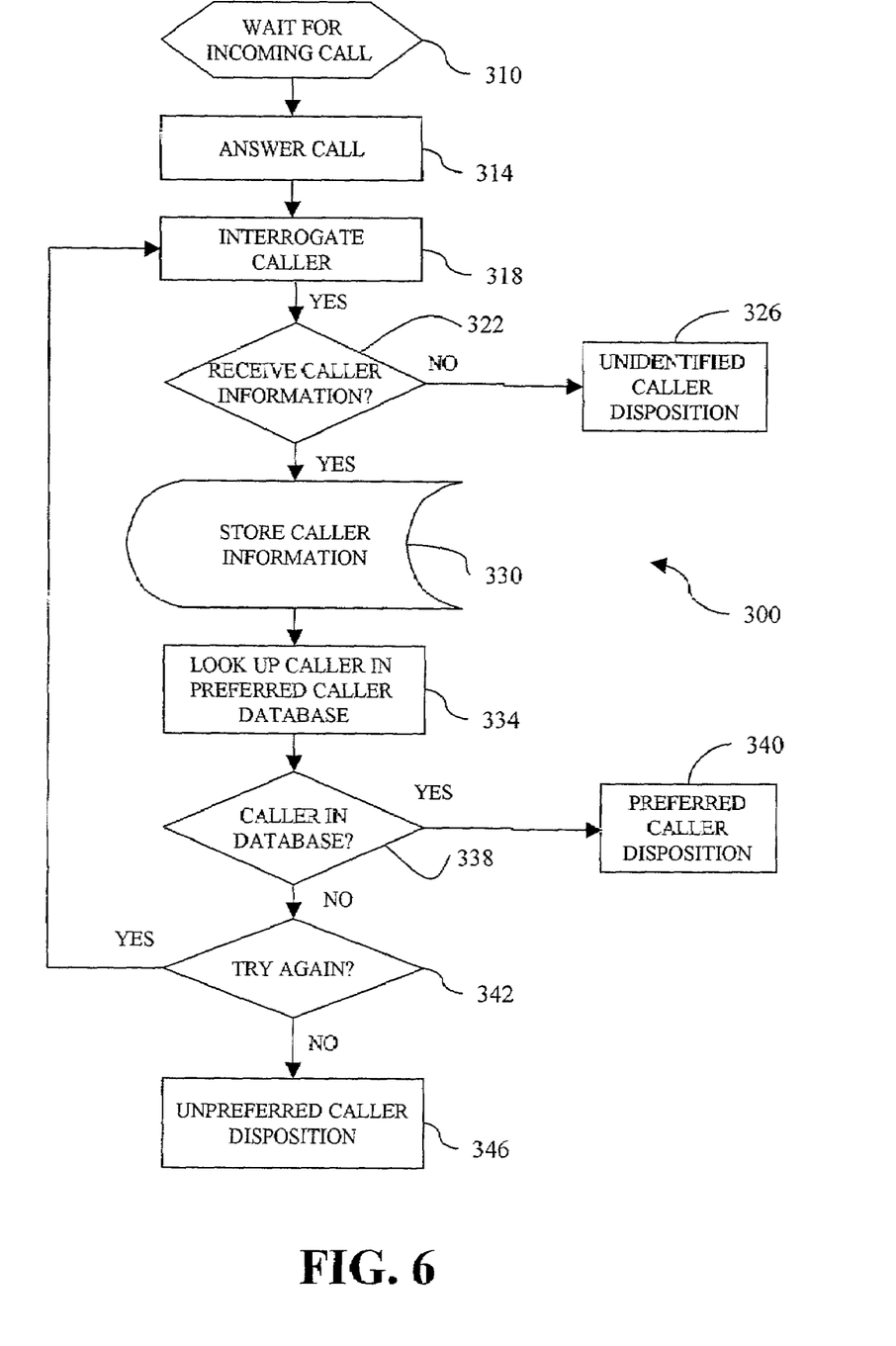
FIG. 6 is a flow chart illustrating the telephone call screening process, according to one method of the present invention.

When the telephone call screening system 10 is activated, the telephone call screening process 300, FIG. 6, begins by waiting for incoming telephone calls to the subscriber, step 310. According to one method, the telephone call screening system 10 can be automatically activated. In one example, the telephone call screening system 10 can be programmed to activate at certain times depending upon the subscriber's schedule. In another example, the telephone call screening system 10 can be programmed to automatically activate when the subscriber's presence is detected. According to a further example, the telephone call screening system 10 can be programmed to automatically activate when the subscriber gives an audible command.

When a call is made to the subscriber, the telephone call screening system 10 automatically answers the telephone call, step 314. The telephony interface 60, for example, automatically connects to the telephone line 64 on which the call is received. The telephone call screening system 10 then interrogates the caller for caller identifying information including at least the private identifier, step 318. The interrogation requesting the identifying information is preferably made by prerecorded messages, which are played to the caller on the answered telephone call by way of the telephony interface 60. The call screening system 10 preferably allows the subscriber to modify the predetermined number of rings before the call is answered and/or the prerecorded messages interrogating the caller.

In one embodiment, the telephone call screening system 10 prompts the use to enter both a public identifier (e.g., a user name or telephone number) and a private identifier (e.g., a pin number or password). If the caller does not enter the requested identifying information in response to the interrogation, steps 322, the system initiates an unidentified caller disposition process, step 326. The call screening system 10 preferably waits for a predetermined period of time to receive the requested identifying information before determining that a caller is unidentified.

If the private identifier is received by the call screening system 10, the private identifier is stored together with any other identifying information received from the caller, step 330. The telephone call screening system 10 then looks up the caller in the preferred caller database 50*a*, 50*b* by searching for a matching private identifier in the preferred caller database, step 334. In one embodiment, the system 10 searches for both the public identifier and the private identifier. If the private identifiers in the preferred caller database are encrypted, they must first be deciphered using the encryption key. If a matching private identifier is not found in the preferred caller database, step 338, the telephone call screening system 10 can try again, step 342, or initiate an unpreferred caller disposition process, step 346.

If the subscriber has established an unwanted caller database, the call screening system 10 also searches the unwanted caller database for a matching private identifier. If a matching private identifier is found in the unwanted caller database, the system can initiate the unpreferred caller disposition process, step 346. According to another example, where the telephone call screening system 10 has a continuous Internet connection, the caller registry database 42 can be searched for a matching private identifier.

If a matching private identifier is found in the preferred caller database, step 338, the telephone call screening system 10 initiates a preferred caller disposition process, step 340. The preferred caller disposition process can include establishing priority of the call based upon the caller and/or the time/date of the call. The preferred caller disposition process can also include announcing the call. One way to announce the telephone call includes recording a message in the caller's voice (e.g., by asking the caller to state his/her name) and then playing that message for the subscriber to hear. Alternatively, a computerized announcement of the caller's name can be used based upon the identifying information in the preferred caller database. The verbal announcement of the caller's name can be made instead of or in addition to the conventional ringing. According to a further alternative, the telephone call screening system 10 announces the call by providing different audible signals (e.g., different types of rings) corresponding to different types of preferred callers (e.g., family, friends, business). According to yet another alternative, the call can be announced using the conventional method of ringing the telephone.

The preferred caller disposition process can also include directing calls from preferred callers to voice mail, depending upon how the call screening system 10 is programmed, either immediately or after a predetermined period of time if the subscriber does not answer the call. The accepted calls can be selectively directed to voice mail based upon the caller and/or the call priority. The accepted calls can also be disposed of or sent to voice mail upon command (e.g., a voice command or clapping) by the subscriber after the call is announced. When calls are sent to voice mail, the caller message, date, time of call, public identifier, and phone number can automatically be logged. The subscriber can then selectively retrieve voice mail messages left by certain callers.

According to one method, the subscriber creates personalized messages for selected callers. The personalized messages are saved and linked to the private identifiers for those callers. If the call screening system 10 determines that a personalized message is linked to the private identifier entered by a caller, the call screening system 10 plays that personalized message to the caller. When prompted, the caller can leave a voice mail message, which is associated with the caller's identifying information. The subscriber can then selectively retrieve voice mail messages associated with the selected callers who were given a personalized message.

The unidentified caller disposition process and the unpreferred caller disposition process can dispose of calls in a number of different ways. For example, the system 10 can either hang up or direct the telephone call to voice mail. Voice mail messages from unidentified or non-preferred callers can be retrieved separately from voice mail messages from preferred callers. The telephone call screening system 10 can also be programmed to accept unidentified or non-preferred calls and more specifically to accept unidentified or non-preferred calls at certain times/dates. If the system determines that an unidentified call or non-preferred call is to be accepted, the call is handled in the same manner as described above. The call screening system 10 can also handle unidentified, non-preferred and unwanted callers differently. For example, the system 10 can automatically hang up an unwanted call or an unidentified call where no identifying information is entered while allowing unpreferred calls to be directed to voice mail. Thus, calls placed automatically by a computer (e.g., telemarketers) or fax machine can be immediately screened out and preferred callers who may have inadvertently entered the wrong private identifier may have an opportunity to leave a voice mail message.

Accordingly, the telephone call screening system and caller registration system of the present invention allows a subscriber to effectively screen telephone calls based on a private identifier unique to the caller. Screening based on a private identifier entered by the caller prevents the inadvertent screening out of preferred callers because of the telephone line used by the caller. Using a private identifier unique to the caller avoids having to give all of the preferred callers a password or PIN unique to the subscriber, which the preferred callers must memorize.

Although the exemplary embodiment is described as a telephone call screening system, the systems and methods described above can also be used in other applications including, but not limited to, screening faxes and e-mails. Modifications and substitutions by one of ordinary skill in the art are considered to be within the scope of the present invention, which is not to be limited except by the claims that follow.

The invention claimed is:

1. A method of screening telephone calls using a computerized telephone call screening system, said method comprising:
   establishing a preferred caller database comprising caller identifying information for preferred callers selected by a subscriber from a caller registry database, wherein said caller identifying information for each caller includes at least a private identifier;
   automatically answering a telephone call placed by a caller;
   interrogating said caller, wherein said computerized telephone call screening system requests from said caller at least a private identifier;
   if said private identifier is not received within a predetermined period of time, initiating an unidentified caller disposition process;
   if said private identifier is received,
     storing said private identifier; and
     searching said preferred caller database for at least said private identifier received from said caller;
   if said caller is not in said preferred caller database, initiating an unpreferred caller disposition process; and
   if said caller is in said preferred caller database, initiating a preferred caller disposition process.

2. The method of claim 1 wherein establishing said preferred caller database includes establishing a local preferred caller database in said computerized telephone call screening system.

3. The method of claim 1 wherein establishing said preferred caller database includes establishing a remote referred caller database located in a caller registration system, and wherein searching said remote preferred caller database further comprises connecting to said caller registration system using said computerized telephone call screening system.

4. The method of claim 1 wherein establishing said preferred caller database comprises:
   connecting to a caller registry database containing identifying information for all registered callers;
   selecting at least one preferred caller from said registered caller; and
   transferring to said preferred caller database said caller identifying information including said private identifier for said selected preferred callers.

5. The method of claim 1 wherein said unidentified caller disposition process and said unpreferred caller disposition process comprise one of disconnecting said telephone call and directing said telephone call to voice mail.

6. The method of claim 1 further comprising repeating the step of interrogating said caller if said caller is not in said preferred caller database.

7. The method of claim 1 wherein said preferred caller disposition process comprises announcing said telephone call based upon said caller and the time of said call.

8. The method of claim 1 wherein said preferred caller disposition process comprises establishing priority of said telephone call based on a time and date of said telephone call.

9. The method of claim 1 wherein said preferred caller disposition process comprises announcing said telephone call.

10. The method of claim 9 wherein announcing said telephone call includes at least one of announcing said public identifier of said caller and providing an audio announcement of said public identifier of said caller.

11. The method of claim 1 wherein said computerized telephone call screening system requests from said caller a public identifier unique to said caller together with said private identifier, and wherein said computerized telephone call screening system searches for a matching public identifier and a matching private identifier.

12. The method of claim 1 wherein said preferred caller disposition process comprises:
   asking said caller to provide an audio message;
   recording said audio message; and
   playing said audio message to announce said call.

13. The method of claim 1 wherein said preferred caller disposition process comprises directing said telephone call to voice mail.

14. The method of claim 13 further comprising playing a personalized prerecorded message associated with said private identifier received from said caller.

15. A method of establishing a preferred caller database for use in a computerized telephone call screening system, said method comprising:
   connecting a caller to a computerized caller registration system;
   prompting said caller for caller identifying information including at least a private identifier selected by said caller and unique to said caller;
   receiving and verifying said caller identifying information;
   storing said caller identifying information in a caller registry database of registered callers;
   connecting a subscriber to said computerized caller registration system;
   verifying that said subscriber is allowed to access said caller registry database;

providing said subscriber with access to said caller registry database;

receiving preferred caller selections from said subscriber, wherein said subscriber selects preferred callers registered in said caller registry database; and transferring said caller identifying information of said preferred callers selected by said subscriber to a preferred caller database.

16. The method of claim 15 further comprising encrypting said private identifiers prior to storing said caller identifying information, and transferring at least one encryption key to said preferred caller database with said caller identifying information.

17. A computerized caller registration system comprising:
means for connecting to a caller;
means for prompting said caller for caller identifying information including at least a private identifier;
means for receiving and verifying said caller identifying information;
means for storing said caller identifying information in a caller registry database of registered callers;
means for connecting to a subscriber;
means for verifying that said subscriber is allowed to access said caller registry database;
means for providing said subscriber with access to said caller registry database;
means for receiving preferred caller selections from said subscriber, wherein said subscriber selects preferred callers registered in said caller registry database; and
means for transferring said caller identifying information of said preferred callers to a preferred caller database including said private identifiers of said preferred callers.

18. The computerized caller registration system of claim 17 wherein said means for transferring said caller identifying information of said preferred callers includes means for transferring said caller identifying information of said preferred callers to a local preferred caller database in said telephone call screening system.

19. A computerized caller registration system comprising:
a telephony interface for interfacing wit at least one telephone line;
a caller registry database containing caller identifying information including at least private identifiers of registered callers;
a caller registration application for prompting said caller for caller identifying information including at least private identifier selected by said caller, for receiving and verifying said caller identifying information, and for storing said caller identifying information in said caller registry database;
a communications interface for interfacing wit a data network;
a database access application for providing said subscriber with access to said caller registry database, for receiving preferred caller selections from said subscriber, wherein said subscriber selects preferred callers from said registered callers in said caller registry database, and for transferring said caller identifying information of said preferred callers to a preferred caller database including said private identifiers of said preferred callers.

20. The computerized caller registration system of claim 19 wherein said preferred caller database is part of said computerized caller registration system.

21. The computerized caller registration system of claim 19 wherein said database access application creates database access web pages, for accessing said caller registry database.

* * * * *